(12) United States Patent
Sturt

(10) Patent No.: US 6,199,934 B1
(45) Date of Patent: Mar. 13, 2001

(54) CARDBOARD VISOR CORE HAVING A FORMED RECESS

(75) Inventor: Alan Sturt, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/460,027

(22) Filed: Dec. 13, 1999

(51) Int. Cl.⁷ .................................................. B60J 3/02
(52) U.S. Cl. ...................... 296/97.1; 296/97.5; 493/143; 362/135
(58) Field of Search .................. 296/97.1, 97.5; 493/167, 142, 143; 362/135

(56) References Cited

U.S. PATENT DOCUMENTS

| | | |
|---|---|---|
| 1,982,511 | 11/1934 | Geist . |
| 2,605,133 | 7/1952 | Newton . |
| 3,610,680 * | 10/1971 | Brady .................................. 296/97.1 |
| 3,843,236 * | 10/1974 | Kurz, Jr. ........................... 296/97.5 X |
| 4,068,930 * | 1/1978 | Marcus ............................. 296/97.5 X |
| 4,275,913 | 6/1981 | Marcus . |
| 4,411,467 * | 10/1983 | Cziptschirsch et al. ............ 296/97.5 |
| 4,494,789 | 1/1985 | Flowerday . |
| 4,711,483 | 12/1987 | Gulette et al. . |
| 4,740,028 | 4/1988 | Connor . |
| 4,773,699 | 9/1988 | Cebollero . |
| 4,791,537 | 12/1988 | Fisher et al. . |
| 4,809,140 | 2/1989 | Jönsas . |
| 4,890,875 | 1/1990 | Takahashi . |
| 5,031,951 * | 7/1991 | Binish ................................ 296/97.1 |
| 5,890,792 * | 4/1999 | Finn et al. ....................... 296/97.5 X |
| 5,895,087 * | 4/1999 | Viertel et al. ....................... 296/97.5 |

\* cited by examiner

*Primary Examiner*—Joseph D. Pape
(74) *Attorney, Agent, or Firm*—Brooks & Kushman P.C.

(57) ABSTRACT

A sun visor core for use with a vehicle includes a cardboard body having a formed recess for receiving a mirror. Advantageously, the recess may be configured so as to enable flush-mounting of the mirror. Preferably the body includes a plurality of inwardly extending side walls and at least one base portion that cooperate to define the recess. A method for manufacturing the sun visor core is also disclosed.

20 Claims, 2 Drawing Sheets

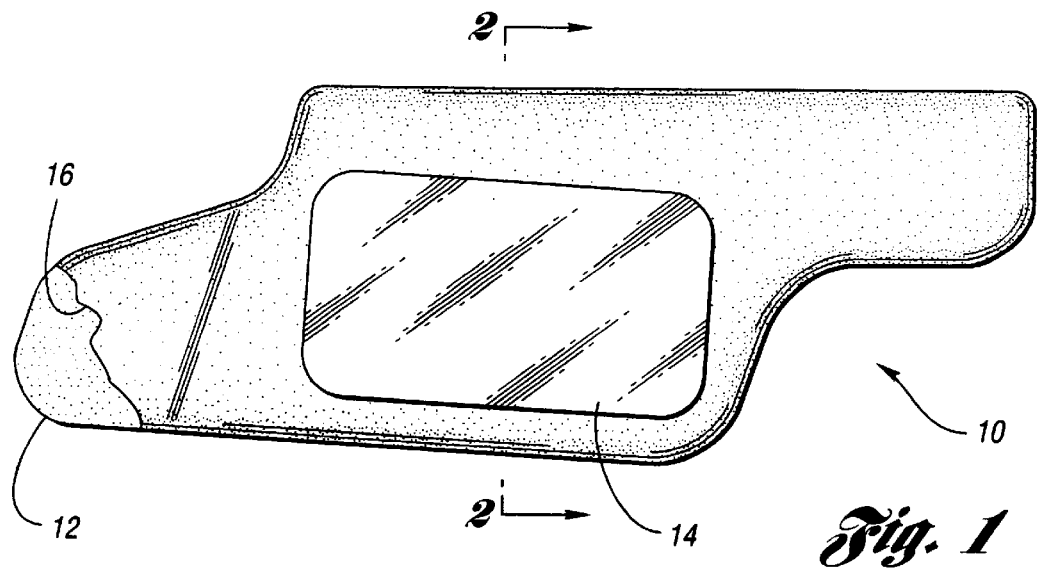
Fig. 1
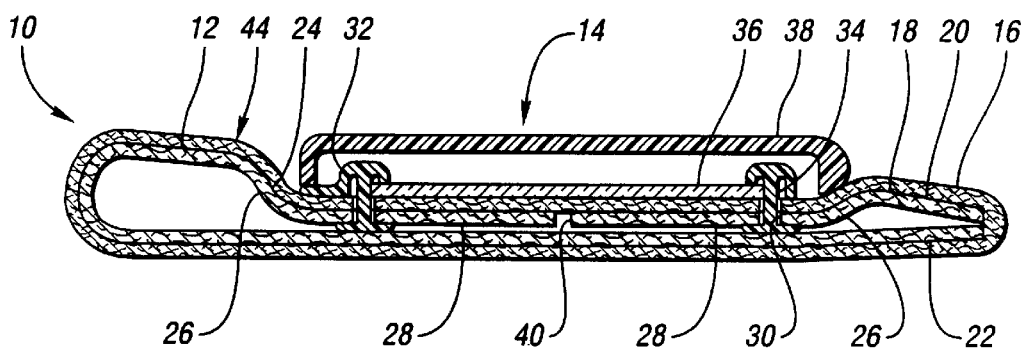
Fig. 2
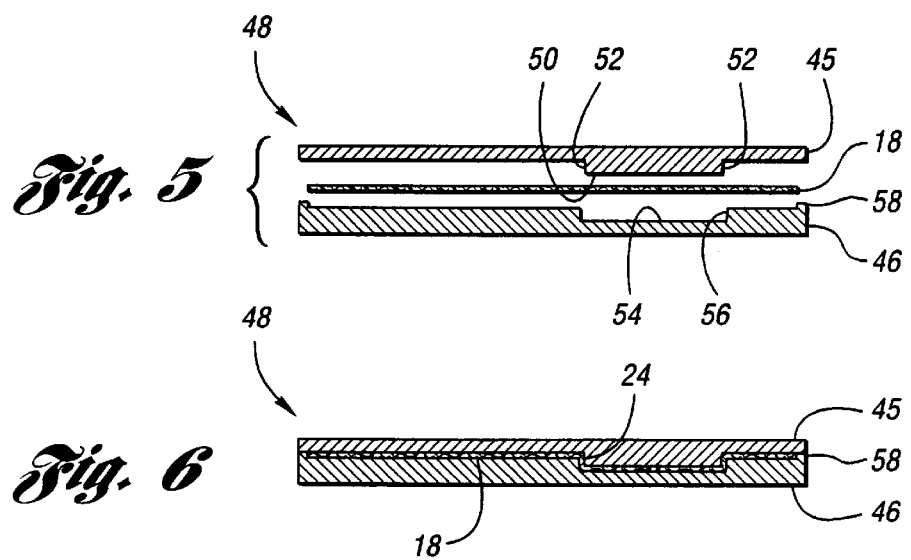
Fig. 5
Fig. 6

CARDBOARD VISOR CORE HAVING A FORMED RECESS

TECHNICAL FIELD

The invention relates to a cardboard sun visor core having a formed recess for receiving a mirror, and a method of manufacturing the sun visor core.

BACKGROUND ART

A prior sun visor for use with a motor vehicle includes a cardboard core having a die-cut rectangular aperture. A molded plastic backing plate is disposed in the aperture, and is heat staked to the core. Furthermore, the backing plate has a molded recess for receiving a mirror assembly. Such a configuration enables the mirror assembly to be mounted flush with an exterior surface of the sun visor. Because of the multiple manufacturing steps required, however, such a sun visor is time-consuming and costly to manufacture.

U.S. Pat. No. 4,494,789 discloses another sun visor including a molded polymeric core having a recess for receiving a mirror assembly. Such a molded core, however, requires expensive tooling to manufacture, and is, therefore, not practical for low volume production.

DISCLOSURE OF INVENTION

The invention overcomes the shortcomings of the prior art by providing an inexpensive and easy to manufacture sun visor core for use with a vehicle, wherein the core is configured to receive a vanity mirror.

Under the invention, a sun visor core for use with a vehicle includes a cardboard body having a formed recess for receiving a mirror. Advantageously, the recess may be configured so as to enable flush-mounting of the mirror.

Preferably the body includes a plurality of inwardly extending side walls and at least one base portion that cooperate to define the recess. Furthermore, the at least one base portion preferably has at least one opening for receiving a fastening member in order to attach the mirror to the body.

Further under the invention, a sun visor for use with a vehicle includes a cardboard core including first and second body portions that are folded together. One body portion has a formed recess. The sun visor further includes a mirror assembly disposed in the recess, and a cover material that covers at least a portion of the core.

A method according to the invention of manufacturing a sun visor core for use with a vehicle includes positioning a cardboard body between male and female mold sections of a mold; and moving one mold section toward the other mold section to form a recess in the body for receiving a mirror.

The method may further comprise cutting one or more slits in the body prior to the positioning step in order to inhibit creasing and/or tearing of the body when the recess is formed in the body.

These and other objects, features and advantages of the invention are readily apparent from the following detailed description of the best modes for carrying out the invention when taken in conjunction with the accompanying drawings.

BRIEF DESCRIPTION OF DRAWINGS

FIG. 1 is a front view of a sun visor according to the invention including a cardboard core, a mirror assembly attached to the core, and a cover material surrounding the core;

FIG. 2 is a cross-sectional view of the sun visor taken along line 2—2 of FIG. 1 and showing first and second body portions of the core folded together, wherein the first body portion includes a molded recess for receiving the mirror assembly;

FIG. 5 is a cross-sectional view of the core positioned between first and second mold sections of a mold; and FIG. 6 is a cross-sectional view of the core with the mold sections closed together to form the recess.

BEST MODE FOR CARRYING OUT THE INVENTION

FIGS. 1 and 2 show a sun visor 10 according to the invention. The sun visor 10 includes a cardboard substrate or core 12, a mirror assembly 14 attached to the core 12, and a cover material 16 that surrounds the core 12.

Figure 3:
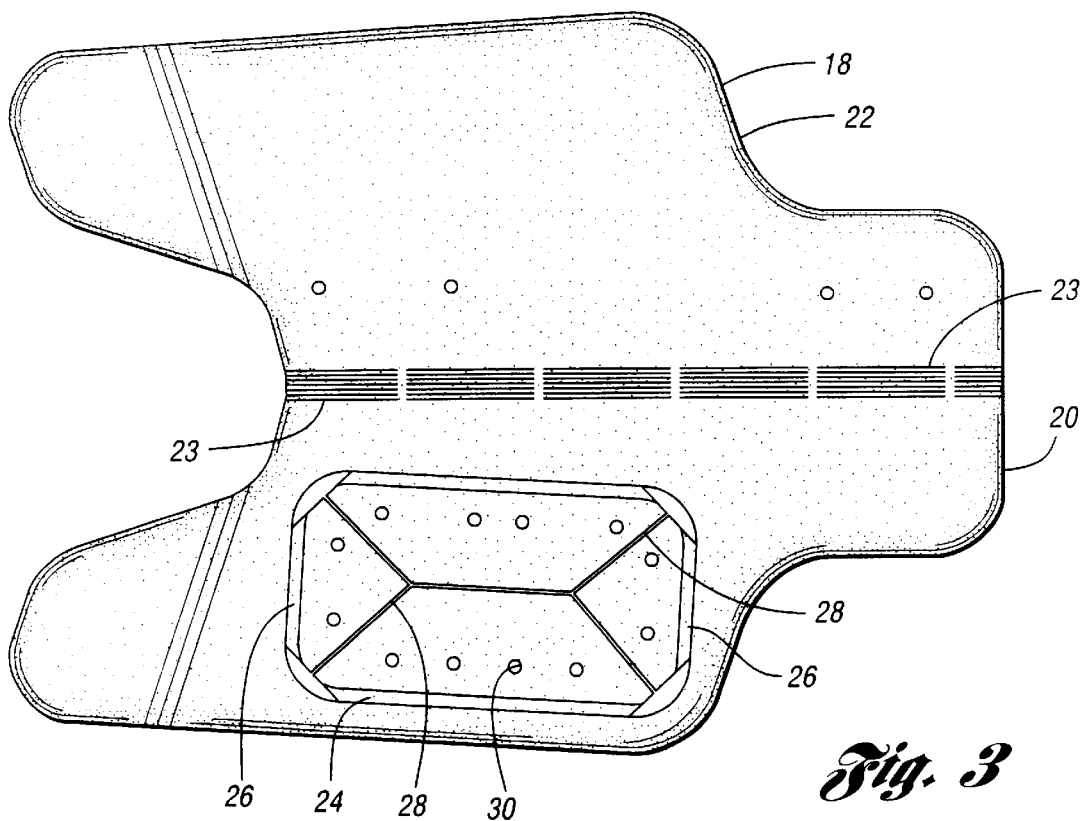
FIG. 3 is a plan view of the core prior to folding the body portions together.

As shown in FIGS. 2 and 3, the core 12 preferably, but not necessarily, has a clam-shell body 18 having first and second body sections or portions 20 and 22, respectively, that are folded together about score lines 23. The first body portion 20 has a formed recess 24 for receiving the mirror assembly 14. The recess 24 is defined by a plurality of inwardly extending side walls 26, and a plurality of base portions 28. The base portions 28 also have a plurality of openings or holes 30 for attaching the mirror assembly 14 to the first body portion 20.

The mirror assembly 14 includes a frame 32 that is disposed in the recess 24 and is attached to the body 18. While the frame 32 may be attached to the body 18 in any suitable manner, the frame 32 is preferably heat-staked to the body 18 using integrally formed thermoplastic stakes 34 that extend through the holes 30. The mirror assembly 14 further includes a mirror 36 that is held in the recess 24 by the frame 32, and a door 38 moveably attached to the frame 32.

Figure 4:
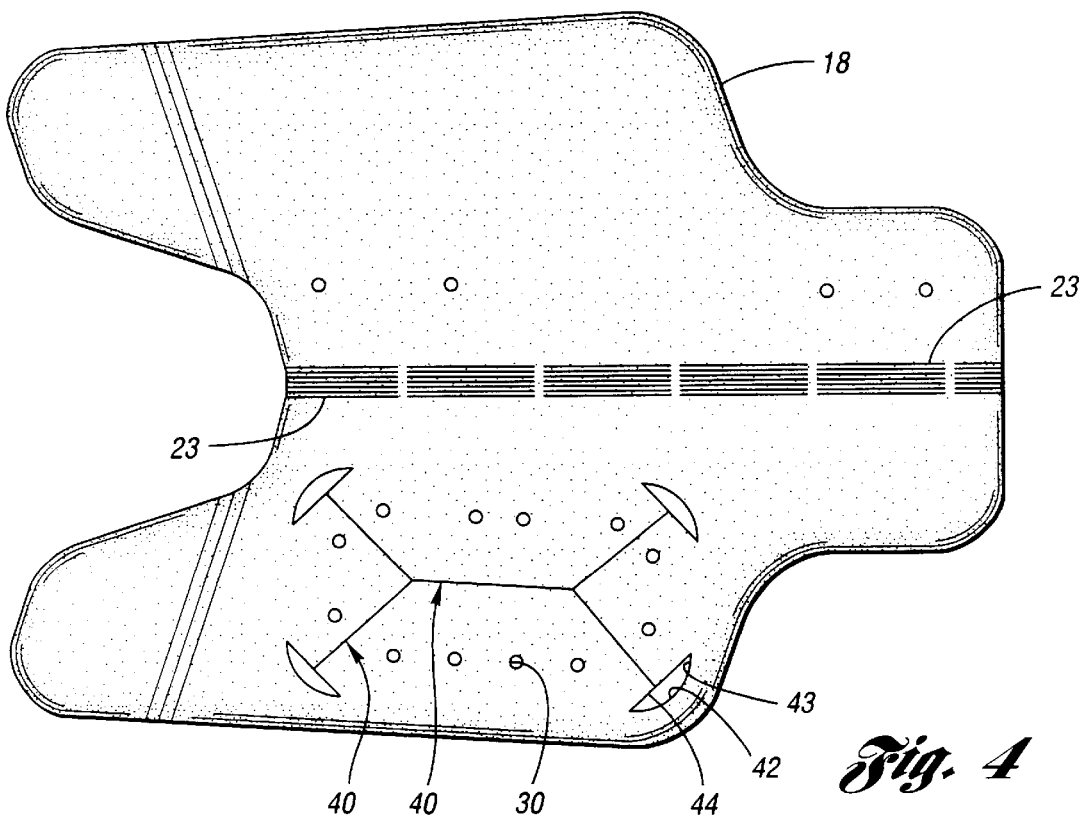
FIG. 4 is a plan view of the core after the core has been die cut from cardboard material.

With reference to FIGS. 1–6, a method of manufacturing the sun visor 10 will now be described. Referring first to FIG. 4, the body 18 is die-cut from cardboard material having a thickness preferably in the range of 0.12 to 0.38 centimeters (0.05 to 0.15 inches). The holes 30, a plurality of slits 40, and a plurality of apertures 42 are also preferably die-cut into the body 18. While the apertures 42 may have any suitable shape, such as a crescent or a circle, the apertures 42 are preferably bow-shaped. More specifically, each of the apertures 42 is preferably defined by a curve 43 and a generally straight line 44. Furthermore, the score lines 23 may also be formed during the die-cutting step, or the score lines 23 may be formed during a separate scoring step.

Next, as shown in FIG. 5, the body 18 is positioned between first and second or male and female mold sections 45 and 46, respectively, of a mold 48. The male mold section 45 includes a protrusion 50 having side walls 52, and the female mold section 46 includes a cavity 54 defined by side walls 56. Preferably, but not necessarily, the side walls 52 and 56 are generally vertical, i.e., each of the side walls 52 and 56 preferably forms an angle of approximately 80 to 90 degrees with respect to a horizontal line. The mold sections 45 and 46 are preferably relatively thin, having a thickness in the range of 2.54 to 7.62 centimeters (1.0 to 3.0 inches), and are preferably made of epoxy. As a result, the mold sections 45 and 46 are relatively inexpensive to manufacture. Furthermore, the mold sections 45 and 46 are relatively light, and may be closed together manually, such as with a manual hydraulic press, or otherwise, such as with an automatic press. Alternatively, the mold sections 45 and 46 may have any suitable thickness, and may comprise any suitable material such as aluminum.

The mold 48 is then closed, as shown in FIG. 6, so as to press the mold sections 45 and 46 against the body 18 to thereby mold or form the recess 24. Because of the spring-back tendencies of cardboard, it is desirable that the side walls 52 and 56 of the male and female mold sections 45 and 46, respectively, be generally vertical in order to form recess side walls 26 that each define an angle of approximately 30 to 60 degrees with respect to a horizontal line. Advantageously, the slits 40 and apertures 42, shown in FIGS. 3 and 4, allow the body 18 to move in a predetermined manner, and inhibit creasing and/or tearing of the body 18 as the recess 24 is being formed. Furthermore, because the body 18 is made of cardboard, a relatively small force, e.g., less than five tons, may be sufficient to close the mold 48.

Although the female mold section 46 is shown with stops 58 for forming a mold gap when the mold 48 is closed, these stops 58 may be eliminated depending on the thickness of the body 18. Alternatively or supplementally, stops may be provided on the male mold section 45.

Returning to FIGS. 1 and 2, the cover material 16 may then be attached to the body 18 to provide an aesthetically pleasing exterior surface 44. Next, the mirror assembly 14 is attached to the body 18, such as by heat staking, and the body portions 20 and 22 of the body 18 are folded together. Alternatively, the mirror assembly 14 may be attached to the body 18 prior to attaching the cover material 16.

Advantageously, the recess 24 allows the mirror assembly 14 to be mounted generally flush with the exterior surface 44. Furthermore, when the mirror assembly 14 is attached to the body 18, the mirror assembly 14 cooperates with the body 18 to maintain a desired shape of the cavity 24.

Because the recess 24 is formed as part of the body 18, the sun visor 10 is significantly less costly to manufacture than prior sun visors that require a separate molded piece to form a recess. Furthermore, because the body 18 comprises cardboard, the tooling required to form the recess 24 is significantly less costly than tooling required to injection mold a plastic core having a recess formed therein.

While embodiments of the invention have been illustrated and described, it is not intended that these embodiments illustrate and describe all possible forms of the invention. Rather, the words used in the specification are words of description rather than limitation and it is understood that various changes may be made without departing from the spirit and scope of the invention.

What is claimed is:

1. A sun visor core for use with a vehicle, the sun visor core comprising a cardboard body having a molded recess for receiving a mirror.

2. The sun visor core of claim 1 wherein the body comprises first and second body portions that are folded together.

3. The sun visor core of claim 1 wherein the body has a plurality of inwardly extending side walls that cooperate to define the recess.

4. The sun visor core of claim 3 wherein the body further has at least one base portion that cooperates with the side walls to define the recess.

5. The sun visor core of claim 4 wherein the at least one base portion has at least one opening for receiving a fastening member in order to attach the mirror to the body.

6. A sun visor for use with a vehicle, the sun visor comprising:

a cardboard core including first and second body portions that are folded together, one body portion having a molded recess;

a mirror assembly disposed in the recess; and a cover material covering at least a portion of the core.

7. A method of manufacturing a sun visor core for use with a vehicle, the method comprising:

positioning a cardboard body between male and female mold sections of a mold; and moving one mold section toward the other mold section to form a recess in the body for receiving a mirror.

8. The method of claim 7 further comprising cutting a slit in the body prior to the positioning step.

9. The method of claim 7 further comprising cutting a plurality of slits in the body prior to the positioning step.

10. The method of claim 9 further comprising cutting a plurality of apertures in the body prior to the positioning step, wherein the apertures are in communication with the slits.

11. The method of claim 7 wherein the recess has a plurality of side walls and a plurality of base portions.

12. The sun visor core of claim 3 wherein the body further has a plurality of spaced base portions that cooperate with the side walls to define the recess.

13. The sun visor core of claim 12 wherein the body further has a plurality of apertures, each aperture being disposed between adjacent side walls.

14. The method of claim 9 wherein the moving step comprises moving one mold portion toward the other mold portion to form the recess such that the recess has a plurality of side walls and a plurality of spaced base portions.

15. A method of manufacturing a sun visor core for use with a vehicle, the method comprising:

cutting a plurality of slits and a plurality of apertures in a cardboard body, such that the apertures are in communication with the slits;

positioning the body between male and female mold sections of a mold after the cutting step; and moving one mold section toward the other mold section to form a recess in the body for receiving a mirror.

16. A method of manufacturing a sun visor for use with a vehicle, the method comprising:

positioning a cardboard body between first and second mold sections of a mold;

moving one mold section toward the other mold section to form a recess in the body; and situating a mirror in the recess.

17. The method of claim 16 further comprising cutting a slit in the body prior to the positioning step.

18. The method of claim 16 further comprising cutting a plurality of slits in the body prior to the positioning step.

19. The method of claim 18 further comprising cutting a plurality of apertures in the body prior to the positioning step, such that the apertures are in communication with the slits.

20. The method of claim 16 wherein the moving step comprises moving one mold portion toward the other mold portion to form the recess such that the recess has a plurality of side walls and a plurality of spaced base portions.

* * * * *